2,956,923
ANTHELMINTIC COMPOSITIONS AND PROCESS

Robert E. Kent, Waterford, Conn., assignor to Chas. Pfizer & Co. Inc., New York, N.Y., a corporation of Delaware No Drawing. Filed July 1, 1958, Ser. No. 745,848

8 Claims. (Cl. 167—53)

The present invention concerns the use of certain new chemical compounds in the treatment of a group of particularly resistant types of helminthic infestations of domestic animals. These compounds are 2-thienylmethyl 2-(2-imidazolinyl) sulfide and its pharmaceutically acceptable acid addition salts. They have been found to possess unique selective toxicity for helminths of the order Strongyloides. Members of this order are nematodes of veterinary importance including hookworms, nodular worms, stomach worms, intestinal worms, and thread-necked strongyle which infest cattle, sheep, dogs, cats, and other animals.

The above helminths are resistant to known anthelmintic agents. Phenothiazine has been widely used in recent years for the treatment of such infestations, but it suffers from a number of disadvantages most noteworthy of which is its limited effectiveness. In those instances where the mature helminths are successfully expelled, the animal is predisposed to reinfection due to the ineffectiveness of this material against the immature infective stages including the ova and larvae.

It is an object, therefore, of the present invention to provide a treatment for refractory nematodes of the above types which is effective for both therapeutic and prophylactic treatment, and which, when used for therapeutic treatment, requires a relatively short regimen. It is also an object to provide such an agent which is relatively cheap so that it can be employed freely for the treatment of domestic animals of importance to the farmer.

It has now been found that 2-thienylmethyl 2-(2-imidazolinyl) sulfide and the pharmaceutically acceptable acid addition salts thereof are uniquely effective against a large number of nematodes and especially those of the families Ancyclostonidae, Strongylidae, and Trichostrongyliae. The drug is effective against both the mature and immature forms of these helminths. It is readily synthesized from common chemical intermediates.

One method of studying the sensitivity of this group of nematodes to chemotherapeutic agents is by selecting a natural parasitic infestation of a laboratory animal exhibiting a similar host-parasite relationship to that found between such parasites and domestic animals. Such a relationship exists between Nematospiroides dubius and laboratory mice. The test with N. dubius in laboratory mice is carried out by collecting the fecal matter of an infected mouse and suspending it in moist charcoal. Patties are prepared and these are incubated at room temperature for 4 to 5 days until the ova hatch and larvae are produced. The larvae are then collected and used to inoculate healthy mice. It has been found that an inoculum of forty larvae per mouse yields a flourishing infestation consisting of about thirty adult worms after a fourteen day developmental period. Established anthelmintics have been found to be ineffective against an inoculum of this size. On the other hand, 2-thienylmethyl 2-(2-imidazolinyl) sulfide hydrochloride is remarkably effective. This conclusion is borne out by the data in Table I. The results obtained with a number of established anthelmintic agents are included for comparison.

It is apparent from Table I that phenothiazine, the drug presently of choice in veterinary medicine for treating gastrointestinal worms in farm animals, exhibits negligible activity against N. dubius. Data have been published on the effectiveness of this material against N.

TABLE I
*Effectiveness compared with established anthelmintic agents vs. N. dubius*

| Drug | Dose (no. of doses), mg./kg. | No. Mice Treated | Number Surviving | Number Cleared | No. Partially Cleared [1] |
|---|---|---|---|---|---|
| 2-Thienylmethyl 2-(2-imidazolinyl) sulfide hydrochloride. | 300 (1) | 8 | 2 | 2 | |
| | 200 (1) | 18 | 16 | 13 | remainder. |
| | 100 (2) | 10 | 9 | 9 | |
| | 100 (1) | 20 | 19 | 13 | Do. |
| | 50 (3) | 20 | all | all | |
| | 50 (2) | 8 | all | all | |
| | 25 (5) | 10 | all | 3 | most of remainder. |
| | 25 (3) | 9 | all | 0 | Do. |
| | 12.5 (5) | 10 | all | 0 | none. |
| | 6.25 (5) | 10 | all | 0/10 | Do. |
| | 6.25 (3) | 10 | all | 0/10 | Do. |
| Tetrachlorethylene | 1,000 (2) | 10 | 9 | 3 | 6. |
| | 1,000 (4) | 10 | 7 | 3 | 2. |
| | 1,000 (5) | 10 | 8 | 7 | |
| | 500 (4) | 5 | all | 2 | |
| | 250 (4) | 5 | all | 0 | |
| Phenothiazanine | 1,000 (3) | 5 | all | 0 | |
| | 500 (3) | 13 | all | 0 | |
| | 500 (2) | 8 | all | 0 | |
| | 500 (10) | 20 | all | 4 | |
| | 250 (10) | 20 | all | 1 | 3. |
| Piperazine Citrate | 200 (8) | 5 | all | 0 | |
| Carbon Tetrachloride | 500 (8) | 5 | all | 0 | |
| 1-Diethylcarbamyl-4-methyl-piperazine hydrochloride. | 500 (8) | 5 | 4 | 1 | |
| | 500 (4) | 5 | all | 0 | |
| | 250 (4) | 5 | all | 0 | |
| 5-Nitrofurfural Semicarbazone | 500 (4) | 5 | none | 0 | |
| | 250 (4) | 5 | all | 0 | |
| Piperazine Carbodithioic Betaine | 200 (8) | 5 | all | 0 | |
| Cadmium Oxide | 100 (8) | 10 | 8 | 0 | 6. |

[1] Number of mice harboring less than five worms at autopsy.

*dubius* in mice which indicate that at a level of 2000 mg./kg. for a period of 24 to 45 days a significant effect can be demonstrated. Tetrachloroethylene, another anthelmintic agent that has met with considerable acceptance in veterinary practice, demonstrates a degree of activity against *N. dubius*. However, this is only observed at a dose of 1000 mg./kg. Comparable activity, on the other hand, is evident at 25 mg./kg. of 2-thienylmethyl 2-(2-imidazolinyl) sulfide hydrochloride when five consecutive daily doses are administered. Single doses of 100 mg./kg. provide complete elimination of the helminths. When only a single treatment or at most two to three treatments are employed at the 25 mg./kg. level, the worm burden is reduced from thirty to nine.

The outstanding activity of 2-thienylmethyl 2-(2-imidazolinyl) sulfide against *N. dubius* is even more convincingly evident in tests measuring the effect of inoculum size on the ability of the drug to cure animals afflicted with this parasite. When two consecutive 100 mg./kg. daily doses of the hydrochloride salt of this drug are administered, uniform control regardless of inoculum size up to 200 larvae per mouse is observed. An inoculum of 200 larvae per mouse produces an infection in untreated control mice averaging 170 helminths per animal. This result is particularly significant when it is considered that presently established anthelmintics are ineffective even against an inoculum of 40 larvae per mouse. These results are summarized in Table II.

TABLE II

*Effect of N. dubius inoculum size on drug effect (2-thienylmethyl 2-(2-imidazolinyl) sulfide hydrochloride)*

| Inoculum Size | Average No. Worms Untreated Control Mice | Average No. Worms Found per Treated Mouse | Percent Reduction |
| --- | --- | --- | --- |
| 40 larvae per mouse | 25 | 0 | 100 |
| 80 larvae per mouse | ¹ 50 | 1 | 98 |
| 200 larvae per mouse | ¹ 75 | 3 | 96 |
| 300 larvae per mouse | 112 | | |
| 500 larvae per mouse | ¹ 187 | 6 | 95 |

¹ By extrapolation.

A further advantage for 2-thienylmethyl 2-(2-imidazolinyl) sulfide and its acid addition salts is that they are larvacidal and ovacidal for many of the nematodes with which the present invention is concerned. This is a very important feature. The life cycle of these parasites is such that the eggs are excreted in the feces of the infected animal, this is used in diagnosis, and reinfection of the host occurs through ingestion of the ova. The ova of some of these species of parasite are infective. In others they must first develop into larvae, and it is the reingestion of these larvae that creates a problem of reinfection and an endemic condition.

The present compositions and method for treating helminthiasis, in addition to being therapeutically and prophylictically useful, also prevents reinfection due to the larvacidal and ovacidal effect obtained. This effect is demonstrated with the parasites *N. dubius* and *Nippostrongylus muris* in mice and rats in the following manner. Twenty milligrams of 2-thienylmethyl 2-(2-imidazolinyl) sulfide is mixed with 1 g. of fecal material from infected animals and blended with 9 g. of animal charcoal. The mixture is then pressed into patties, moistened, and allowed to stand at room temperature for six days. Control patties without the drug are also prepared. After this incubation period the patties are examined for the presence of larvae and if larvae are found, their viability is appraised both by visual examination and by inoculation into test animals to determine whether an infection from them can be produced.

In the evaluation of 2-thienylmethyl 2-(2-imidazolinyl) sulfide hydrochloride against *N. dubius* in mice, the drug appeared to be without effect on the ova since comparable numbers of larvae appeared in the treated and control patties. However, the larvae in the treated patties appeared to be dead. This observation was confirmed when an attempt was made to infect ten mice with an inoculation of 50 each of these larvae. Larvae from the control patties produced a typical infection in the usual fourteen day period. Autopsy of the test mice revealed that seven out of ten had no infection, two of the ten had one worm each, and one mouse had a burden of three worms. In the case of *N. muris*, an ovacidal effect was observed since no larvae developed in the treated patties. The eggs had been killed, and lysis had taken place.

The observation that 2-thienylmethyl 2-(2-imidazolinyl) sulfide has a larvacidal effect for *N. dubius* was further confirmed in experiments designed to test the use of this material as a prophylactic agent. Test mice were inoculated in the usual fashion and drug treatment started at once rather than waiting for the parasites to develop as is done in testing for therapeutic effect. At the end of the usual incubation period, the mice were sacrificed and examined and found to be free of infection.

According to the present invention, 2-thienylmethyl 2-(2-imidazolinyl) sulfide and its acid addition salts are administered to animals suffering from infestation with helminths of various types by the oral route in a dosage of from 5 to 50 mg./kg. of body weight. This can be achieved by a number of methods including mixing with the feed, dosage unit formulations such as capsules, tables, liquid mixtures and solutions including drench solutions, or they can be administered in admixture with minerals such as sodium chloride which are frequently fed to animals as a supplement. Although the dosage specified is based on active ingredient, namely 2-thienylmethyl 2-(2-imidazolinyl) sulfide, in practical use the acid addition salts specified and the free base can be used interchangeably, except as otherwise noted below.

For therapeutic use, a dosage of 25 to 30 mg./kg. is recommended. Ordinarily a single dose is sufficient, but in the event multiple doses are employed, this dose is repeated on two or three consecutive days. Since the present method is effective against not only the mature worms but also against the larval stages, it is not necessary to repeat the dosage after a period of two to three weeks as is commonly done with prior anthelmintic agents. For administration to sheep, goats, cattle, horses and swine on a therapeutic basis, a drench solution which is squirted down the animal's throat by a means of a drenching syringe is convenient. For this purpose an aqueous solution of 2-thienylmethyl 2-(2-imidazolinyl) hydrochloride or other water soluble pharmaceutically acceptable acid addition salt such as the hydrobromide, phosphate, nitrate, acetate, etc. is employed.

A high water solubility is exhibited by the acid addition salts of 2-thienylmethyl 2-(2-imidazolinyl) sulfide, and particularly the hydrochloride salt. Solutions having concentrations ranging from about 3% up to the limit of solubility of the salt (ca. 50% in the case of the hydrochloride) are satisfactory for drench solutions. More dilute solutions, however, can be supplied for drinking purposes. A 0.1% solution is useful.

For prophylactic use, 5 to 10 mg./kg. of body weight daily is administered. The above methods of administration are suitable although administration in the animal's food, water, or mineral mixture is more convenient.

Boluses and capsules are also used for the therapeutic treatment of animals. For animals weighing from 30 to 1000 pounds the usual dose ranges from ½ to 15 grams. Boluses of suitable sizes containing these quantities of materials can be prepared by conventional methods. However, for a 15 g. dose, it is frequently more convenient to employ two or more boluses of smaller size rather than a single bolus containing this quantity of material.

There appears to be some tendency for the material to hydrolyze in aqueous solution. It is preferred, therefore, when employing a drench solution to makeup the solution just prior to administration rather than keeping the aqueous solution for a prolonged period of time. Due to the high solubility of the acid addition salts in water, this presents no practical difficulty.

Dry mineral mixtures containing 2-thienylmethyl 2-(2-imidazolinyl) sulfide are prepared containing from 0.10 to about 1% of the active ingredient mixed with salt (sodium chloride) and other minerals with which it is desired to treat the animal. This can then be fed on an ad libitum basis by adjusting the proportion of active ingredient in the mixture to the average daily consumption per animal so as to provide the proper daily dose as specified above. If prepared feed supplements are employed, the material can be administered in admixture with the feed. Again a concentration range of about 0.10 to 1% of the drug in the feed is employed. However, higher proportions can be satisfactorily employed depending upon the palatability of the product to the animal. This can be readily determined by simple experimentation. It is generally advisable to mix the daily dose with only a portion of the animal's average daily allotment to insure complete consumption of the dose. The balance of his daily feed supplement can then be fed after consumption of the medicated portion in the usual fashion. These methods are particularly useful for prophylactic treatment, but similar compositions can be employed for therapeutic use. Concentrations of drug in the feed or mineral mixture up to from 2 to 5%, depending again upon the palatability of the material, are sometimes useful.

The following examples are provided to illustrate in greater detail the manner of practicing the present invention. They are, however, not to be considered as limiting the scope thereof in any way. The scope is set forth in the appended claims.

*Example I—Preparation of 2-thienylmethyl 2-(2-imidazolinyl) sulfide hydrochloride.*—A solution containing 156 g. of concentrated hydrochloric acid and 126 g. of formalin (37–40% aqueous formaldehyde) is cooled to 0° C. and anhydrous hydrogen chloride gas is fed into the mixture until 110 g. of gas is absorbed. To this mixture is added 126 g. of thiophene at a temperature of −10 to 0° C. The addition is carried out slowly in order to maintain the temperature within this range and when complete, the mixture is agitated for an additional twenty minutes. Water, 165 ml., is then added, the immiscible layers separated, and the aqueous layer extracted with 225 ml. of petroleum ether. The ether extract and the organic layer are combined and washed with an equal volume of an aqueous solution containing 20 g. of sodium bicarbonate. This washing is followed with a water wash and the organic layer then dried over anhydrous sodium sulfate. The dried extract is then transferred to a still, along with 3.2 g. of N-methylmorphaline, and the product, 2-chloromethylthiophene, distilled at 42° C./2.4 mm. Hg after removal of the solvent.

This material is then converted to the 2-imidazolinyl sulfide by mixing 90 g. thereof slowly with 69 g. of ethylenethiourea dissolved in 300 ml. of refluxing methanol. After the addition is complete, the mixture is stirred for an additional 20 minutes, cooled to 0° C., and the product precipitated by the addition of 800 ml. of ethyl ether. The crude product is collected on a filter. This material has a melting point of 162–165° C. dec., and is comprised principally of 2-thienylmethyl 2-(2-imidazolinyl) sulfide hydrochloride contaminated with a minor proportion of 2,5-bis(2-imidazolinylmercapto)thiophene dihydrochloride and smaller amounts of other impurities.

The pure product can be obtained by recrystallization from water employing approximately 1 ml. of water per gram of crude product, or by fractional precipitation from methanol with ether. The latter method is less wasteful of the desired product, and is achieved by dissolving the crude product in 2.5 ml. of methanol per gram of crude product and removing insoluble impurities after treatment of the solution with 2.5 ml. of diethyl ether per gram of product. Purified 2-thienylmethyl 2-(2-imidazolinyl) sulfide hydrochloride, M.P. 175–180° C. dec., is recovered by the addition of 2 to 3 ml. of ether to the clear filtrate per gram of crude product charged. This purified material has a purity of at least 90–95% and is entirely satisfactory for pharmaceutical as well as veterinary compositions and use.

A small sample of water recrystallized product is recrystallized several times from ethanol to provide a pure while crystalline substance of melting point 182–183° C. dec. which cannot be raised by further recrystallization. When analyzed, its composition is found to agree with the values calculated for 2-thienylmethyl 2-(2-imidazolinyl) sulfide hydrochloride.

*Analysis.*—Calcd. for $C_8H_{11}N_2S_2Cl$: C, 40.92; H, 4.73; N, 11.93. Found: C, 40.90; H, 4.75; N, 11.37.

*Example II—Conversion of 2-thienylmethyl 2-(2-imidazolinyl) sulfide hydrochloride to the free base and to other acid addition salts.*—2-thienylmethyl 2-(2-imidazolinyl) sulfide is insoluble in water. The free base can, therefore, be readily obtained from the hydrochloride by neutralization of an aqueous solution of the hydrochloride salt. The water insoluble sulfide is then collected by mechanical means or by solvent extraction. A convenient method specifically comprises neutralizing a relatively dilute aqueous solution (5–10%) by the gradual addition of dilute sodium hydroxide with vigorous stirring. Room temperature or a slightly elevated temperature is preferably employed so that precipitation of the insoluble product takes place at slow rate to assist in the formation of an easily filterable crystalline product. The addition of seed crystals is sometimes helpful. The pure free base is then collected, washed with water, and air dried. The preparation of various acid addition salts is achieved by simply dissolving the free base in aqueous or alcoholic solutions of the desired acids. The salts are recovered by precipitation with a non-solvent, by evaporation, or by lyophylization when an aqueous solution is employed. The latter is an extremely convenient procedure which provides the pure salt when the pure base and the calculated quantity of aqueous acid is employed. In this manner, the acetate, phosphate, nitrate, sulfate, benzoate, propionate, and butyrate salts are prepared. Other conventional means for the preparation of salts can be employed such as treatment of one 2-thienylmethyl 2-(2-imidazolinyl) salt with a metal salt in a suitable solvent for both reactants to provide for precipitation of the undesired anion and replacement by the anion of the metal salt. For instance, the hydrochloride salt dissolved in aqueous solution, and treated with silver nitrate results in the precipitation of silver chloride and formation of the nitrate salt. Anion exchange resins can also be employed.

*Example III—Tablets and boluses.*—A convenient tablet size to provide this is one containing 250 mg. of the drug. Such tablets are prepared by thoroughly blending 250 g. of 2-thienylmethyl 2-(2-imidazolinyl) sulfide, and 50 g. of starch in a twin shell blender. The blended powders are then mixed with sufficient ethanol to make an easily manipulated paste which is extruded through a 10-mesh screen to provide granules which are dried in vacuo until all the solvent is removed. The granules are coated with magnesium stearate by briefly blending with 2% the total weight of granules of that substance. This mixture is then fed to a tableting press to produce tablets containing 250 mg. of 2-thienylmethyl 2-(2-imidazolinyl) sulfide in addition to proportionate quantities of the carriers and excipients listed above. For animals, the daily dose varies from ½ to 15 g. per day depending again upon the body weight of the animal. Boluses of various sizes can be prepared in the same fashion by simply selecting a die of appropriate size. The complete daily dose of 15 g. can be incorporated into a single bolus.

*Example IV—Capsules.*—2-thienylmethyl 2-(2-imidazolinyl) sulfide and its acid addition salts are conveniently encapsulated in hard gelatin capsules. For therapeutic and prophylactic purposes, from about 250 mg. to 1 gram of these agents can be contained in a single capsule. It is convenient to mix the active ingredient with a solid diluent, for instance, calcium phosphate. From about 15 to 50% the weight of drug of tricalcium phosphate is employed. Thus, a hard gelatin capsule is prepared by thoroughly blending two parts by weight of 2-thienylmethyl 2-(2-imidazolinyl) sulfide phosphate with one part by weight of calcium phosphate in a twin shell blender. The powder was then subdivided, and loaded into hard gelatin capsules in such a fashion that each capsule contains 250 mg. active ingredient.

*Example V—Mineral mixture.*—One part by weight of 2-thienylmethyl 2-(2-imidazolinyl) sulfide is mixed with nineteen parts by weight of the usual granular stock of salt (sodium chloride). The mixture is thoroughly blended and fed to the animals in such quantities as to provide the recommended daily dose. Such salt mixtures can also be incorporated into block form, but this is not preferred due to lack of control of the dosage size received by the animal.

*Example VI—Drench solution.*—To make 100 pounds of drench containing 5 g. of 2-thienylmethyl 2-(imidazolinyl) sulfide hydrochloride per fluid ounce, use 16.6 pounds of the active ingredient, 3 pounds of bentonite, and 55.5 pounds of water (6.3 gallons). Add all the water in the mixing tank, add the bentonite, and agitate until the slurry is uniform. The 2-thienylmethyl 2-(2-imidazolinyl) sulfide hydrochloride is added with agitation and the slurry mixed until the product is smooth and uniform. A daily dose of this solution for cattle averaging 1000 lbs. in weight is 3 fluid ounces. It is conveniently administered by means of a standard stainless steel drenching syringe. For animals weighing less than 1000 lbs., a proportionately smaller dose is employed. More dilute drenches are also useful. For prophylactic purposes, a very dilute aqueous solution, say 0.1%, can be administered for drinking purposes.

*Example VII—Feed mixture.*—For prophylactic use, a feed mixture containing 2-thienylmethyl 2-(2-imidazolinyl) sulfide is convenient. The usual prophylactic dose is from 2.5 to 5 g. daily for 1000 pound cattle. Assuming such animal consumes 10 lbs. of feed supplement per day, 1 pound per ton of 2-thienylmethyl 2-(2-imidazolinyl) hydrochloride would be incorporated. Depending upon the feed consumption of the animal and the dosage employed, the proportion in the feed of 2-thienylmethyl 2-(2-imidazolinyl) hydrochloride varies from .05% up to about 1% on a weight basis.

What is claimed is:

1. A process for the veterinary control of helminthiasis primarily due to nematodes which comprises the oral administration to an animal suffering therefrom of from about 5 to 50 mg./kg. of body weight of a compound selected from the group consisting of 2-thienylmethyl 2-(2-imidazolinyl) sulfide and the pharmaceutically acceptable acid addition salts thereof.

2. The process of claim 1 wherein said compound is administered in dosage unit form.

3. The process of claim 1 wherein said compound is administered to an animal admixed with the feed.

4. The process of claim 1 wherein said compound is administered to an animal admixed with a mineral supplement.

5. The process of claim 1 wherein a water soluble pharmaceutically acceptable acid addition salt of 2-thienylmethyl 2-(2-imidazolinyl) sulfide is administered to an animal as an aqueous solution thereof having a concentration of from 0.1% by weight up to the limit of the solubility of said salt.

6. A process for the veterinary treatment of helminthiasis primarily due to nematodes which comprises the oral administration to an animal suffering therefrom of from 25 to 30 mg./kg. of body weight of a compound selected from the group consisting of 2-thienylmethyl 2-(2-imidazolinyl) sulfide and the pharmaceutically acceptable acid addition salts thereof.

7. A process for the veterinary prevention of helminthiasis primarily due to nematodes which comprises oral administration to an animal of from 5 to 10 mg./kg. of body weight a compound selected from the group consisting of 2-thienylmethyl 2-(2-imidazolinyl) sulfide and the pharmaceutically acceptable acid addition salts thereof.

8. A medicated veterinary feed composition primarily adapted to the control of intestinal nematodes comprising a major proportion of an animal feed stuff and from 0.1 to 5% by weight of a compound selected from the group consisting of 2-thienylmethyl 2-(2-imidazolinyl) sulfide and the pharmaceutically acceptable acid addition salts thereof.

References Cited in the file of this patent

Watkins: J. Pharmacy and Pharmacology, vol. 10, No. 4, April 1958, pp. 209–211.

UNITED STATES PATENT OFFICE
CERTIFICATE OF CORRECTION

Patent No. 2,956,923        October 18, 1960

Robert E. Kent

It is hereby certified that error appears in the printed specification of the above numbered patent requiring correction and that the said Letters Patent should read as corrected below.

Column 3, line 60, for "prophylictically" read -- prophylactically --; lines 62 and 63, for "Nippostronglyus", in italics, read -- Nippostrongylus -- in italics; column 8, lines 36, after "body weight" insert -- of --.

Signed and sealed this 11th day of April 1961.

(SEAL)
Attest:
ERNEST W. SWIDER
Attesting Officer

ARTHUR W. CROCKER
           Acting Commissioner of Patents